United States Patent [19]
Ollivier

[11] Patent Number: 5,755,428
[45] Date of Patent: May 26, 1998

[54] VALVE HAVING METAL-TO METAL DYNAMIC SEATING FOR CONTROLLING THE FLOW OF GAS FOR MAKING SEMICONDUCTORS

[75] Inventor: Louis A. Ollivier, Palto Alto, Calif.

[73] Assignee: Veriflow Corporation, Richmond, Calif.

[21] Appl. No.: 575,022

[22] Filed: Dec. 19, 1995

[51] Int. Cl.$^6$ .................................................. F16K 7/17
[52] U.S. Cl. ........................ 251/331; 251/63.5; 251/359
[58] Field of Search ........................ 251/331, 63.5, 251/333, 359

[56] References Cited

U.S. PATENT DOCUMENTS

| | | | |
|---|---|---|---|
| 4,828,219 | 5/1989 | Ohmi et al. | 251/331 X |
| 5,253,671 | 10/1993 | Kolenc | 251/331 X |
| 5,326,078 | 7/1994 | Kimura | 251/331 |
| 5,551,477 | 9/1996 | Kanno et al. | 251/331 X |
| 5,653,419 | 8/1997 | Uchisawa et al. | 251/331 X |

*Primary Examiner*—Kevin Lee
*Attorney, Agent, or Firm*—Antonelli, Terry, Stout & Kraus, LLP

[57] ABSTRACT

A valve having metal-to-metal dynamic seating for controlling the flow of gas includes a valve body having a gas passage extending therethrough, a metal seat extending about the gas passage, a flexible metal diaphragm mounted in the valve so the diaphragm can be moved into and out of sealing contact with the metal seat to respectively close and open the gas passage, and an actuator operable for opening and closing the gas passage by way of movement of the diaphragm relative to the metal seat. The actuator includes a metal backing member forcedly contacting the diaphragm during closing of the gas passage on a side of the diaphragm opposite a side thereof which makes sealing contact with the metal seat. The metal seat and the metal backing member are configured such that the sealing contact between the metal diaphragm and the metal seat is a relatively narrow line of contact extending about the gas passage. The metal seat is formed of a relatively soft metal and each of the metal diaphragm and metal backing member is formed of a relatively hard metal for attaining near absolute closure by the valve without the use of plastics or elastomers in contact with the gas.

13 Claims, 2 Drawing Sheets

VALVE HAVING METAL-TO METAL DYNAMIC SEATING FOR CONTROLLING THE FLOW OF GAS FOR MAKING SEMICONDUCTORS

RELATED APPLICATION

Applicant has filed concurrently with this application the commonly assigned application Ser. No. 08/575,021, filed Dec. 19, 1995, for APPARATUS FOR DELIVERING PROCESS GAS FOR MAKING SEMICONDUCTORS AND METHOD FOR USING SAME, the disclosure of which is hereby incorporated by reference.

FIELD OF THE INVENTION

The present invention relates to an improved high purity valve useful, for example, for supplying high purity gas for making semiconductors.

BACKGROUND AND SUMMARY OF THE INVENTION

Semiconductor manufacturing involves the use of process gas which is delivered from a supply of the process gas to the manufacturing tool through a system that includes tubing, valves and a pressure regulator, for example. Increased emphasis is being placed on preserving the integrity of the process gas as it travels through the delivery system. Significant progress has been made by machining the surfaces in contact with the gas to a very fine finish, leaving out parts that could contribute to particulate contamination such as a bias spring within a pressure regulator, and cleaning the surfaces to insure a very low particle count, e.g. a small number of particles down to 0.2 micron size.

Valves manufactured today for high purity applications typically use Kel-F type fluorocarbon polymers for seating. Such plastics adsorb moisture during valve manufacture and release it slowly during valve use in a dry gas system. Residual moisture levels required are currently less than 10 parts per billion. As feature widths in semiconductors become smaller, e.g. less than 0.5 micron, the requirement for drier systems becomes increasingly important.

An object of the present invention is to provide an improved high purity valve which overcomes the aforementioned drawback of conventional valves for high purity applications. More particularly, an object of the present invention is to provide an improved high purity valve which makes it possible to use highly corrosion-resistant materials for the valve without reducing performance, and wherein adsorption of moisture inside the valve is greatly reduced by the total elimination of plastics or elastomers in contact with the gas.

A further object of the invention is to provide an improved apparatus for supplying high purity gas for making semiconductors which employs the improved valve of the present invention to make further improvement in preserving the integrity of the process gas as it travels through the apparatus.

These and other objects are attained by the improved valve of the present invention which employs metal-to-metal dynamic seating in the valve thereby making it possible to use highly corrosion-resistant materials for the valve without reducing the performance. Most particularly, in the processing of high purity gas, the adsorption of moisture inside the valve is greatly reduced by the total elimination of plastics or elastomers in contact with the gas.

The performance demanded of the valve in apparatus for supplying high purity gas for making semiconductors is for near absolute closure, e.g. a leakage rate of less than $1 \times 10^{-8}$ SCC/sec (standard cubic centimeters per second). It is problematical to attain such performance using metal-to-metal seated valves, particularly where relatively low forces are available for providing reliable pressure control in the valve, as is the case with relatively small, instrument valves like those of the present invention for use in supplying high purity gas for making semiconductors.

This problem is overcome by the valve of the present invention which has metal-to-metal dynamic seating for controlling the flow of gas. The valve comprises a valve body having a gas passage extending therethrough for the flow of gas, a metal seat extending about the gas passage, a flexible metal diaphragm mounted in the valve so that the diaphragm can be moved into and out of sealing contact with the seat to respectively close and open the gas passage, and an actuator for the positive transfer of sealing force from the actuator to the seat through the diaphragm. The actuator is operable for opening and closing the gas passage by way of movement of the diaphragm away from and toward the metal seat. The actuator includes a metal backing member contacting the diaphragm on a side of the diaphragm opposite a side thereof which makes sealing contact with the metal seat. The metal seat and the metal backing member are configured such that the sealing contact between the diaphragm and the metal seat is a relatively narrow, continuous line of contact extending about the gas passage. This is achieved in that the metal seat is formed of a relatively soft metal with a relatively small radius around the seating cross section of the seat and each of the metal diaphragm and the metal backing member is formed of a relatively hard metal for proper transfer of sealing pressure through the diaphragm to the seat.

As a result of these features of the invention, stresses needed to force the hard diaphragm into intimate sealing contact with the softer metallic seat can be generated so as to make a near absolute closure or seal. Further, the pressure generated during valve closing will stress the softer seat sufficiently to flatten any asperities or geometrical errors in machining of the seat on the order of 0.001 inch or smaller since the stresses on these exceed the yield strength of the seat material and thereby reshape the seat to give the aforementioned relatively narrow (0.002 inch wide for example), continuous line of contact between the diaphragm and the seat. In that formed condition, a tight seal can be obtained with the relatively low actuator force available in the relatively small instrument valve.

In a disclosed, preferred embodiment of the present invention the metal seat is formed integrally with the valve body and includes a rounded, metal sealing projection formed of a relatively soft metal. In the illustrated embodiment the projection has a hardness of Rockwell B65 to B100 and is formed of stainless steel. The hardness of the flexible metal diaphragm is Rockwell C50 or greater, preferably C60 to C70. The metal diaphragm has a thickness of 0.001–0.004 inch in the disclosed embodiment. The metal backing member has a hardness greater than Rockwell C25 in the disclosed embodiment.

The metal backing member in the illustrated embodiment has a contour which is convexly rounded at the surface thereof which contacts the diaphragm on a side of the diaphragm opposite the side which contacts the rounded, metal sealing projection of the seat during closing of the gas passage in the valve. A preferred form of the rounded, metal sealing projection is toroidal. The toroidal sealing projection preferably has a radius of curvature of 0.005–0.020 inch as seen in a cross section taken along a longitudinal central axis of the toroidal sealing projection, in order to generate the necessary stresses for sealing contact with the diaphragm under the relatively low level of force available from the actuator in the relatively small valve of the invention.

The actuator of the valve forces the metal diaphragm against the rounded, metal sealing projection of the seat by way of the metal backing member with a force of between 50 and 150 pounds when the gas passage is closed by the actuator. In the disclosed embodiment the actuator is a pneumatic actuator which applies a force of between 100 and 120 pounds for effecting sealing contact. The actuator includes a cylinder and at least one piston slidably arranged in the cylinder, spring means for yieldably biasing the at least one piston in a direction for closing the gas passage with the aforementioned closing force, means for introducing a pressurized gas for moving the at least one piston against the biasing force of the spring means for opening the gas passage, and a piston rod for transmitting the closing force from the piston to the metal backing member.

The metal backing member in the illustrated embodiment is in the form of a piston. The piston is slidably arranged in the valve for movement toward and away from the rounded, metal sealing projection of the valve seat as a function of the forces on the piston from the actuator and from pressurized gas in the valve which acts on the diaphragm.

An apparatus for supplying high purity gas for making semiconductors, which apparatus utilizes the valve of the present invention, comprises a supply of pressurized gas to be supplied, and fluid passage means for conveying gas from the supply to an outlet of the apparatus. The fluid passage means includes a pressure regulator for regulating the pressure of the gas from the supply which flows to the outlet via the fluid passage means, a mass flow controller located downstream of the pressure regulator in the fluid passage means for controlling gas flow to the outlet of the apparatus, and a valve for opening and closing the fluid passage means for controlling the flow of the gas through the fluid passage means. These and other objects, features and advantages of the present invention will become more apparent from the following detailed description of a disclosed, preferred embodiment of the invention taken with the accompanying drawings, which illustrate the embodiment.

DETAILED DESCRIPTION OF DISCLOSED EMBODIMENT

Figure 1:
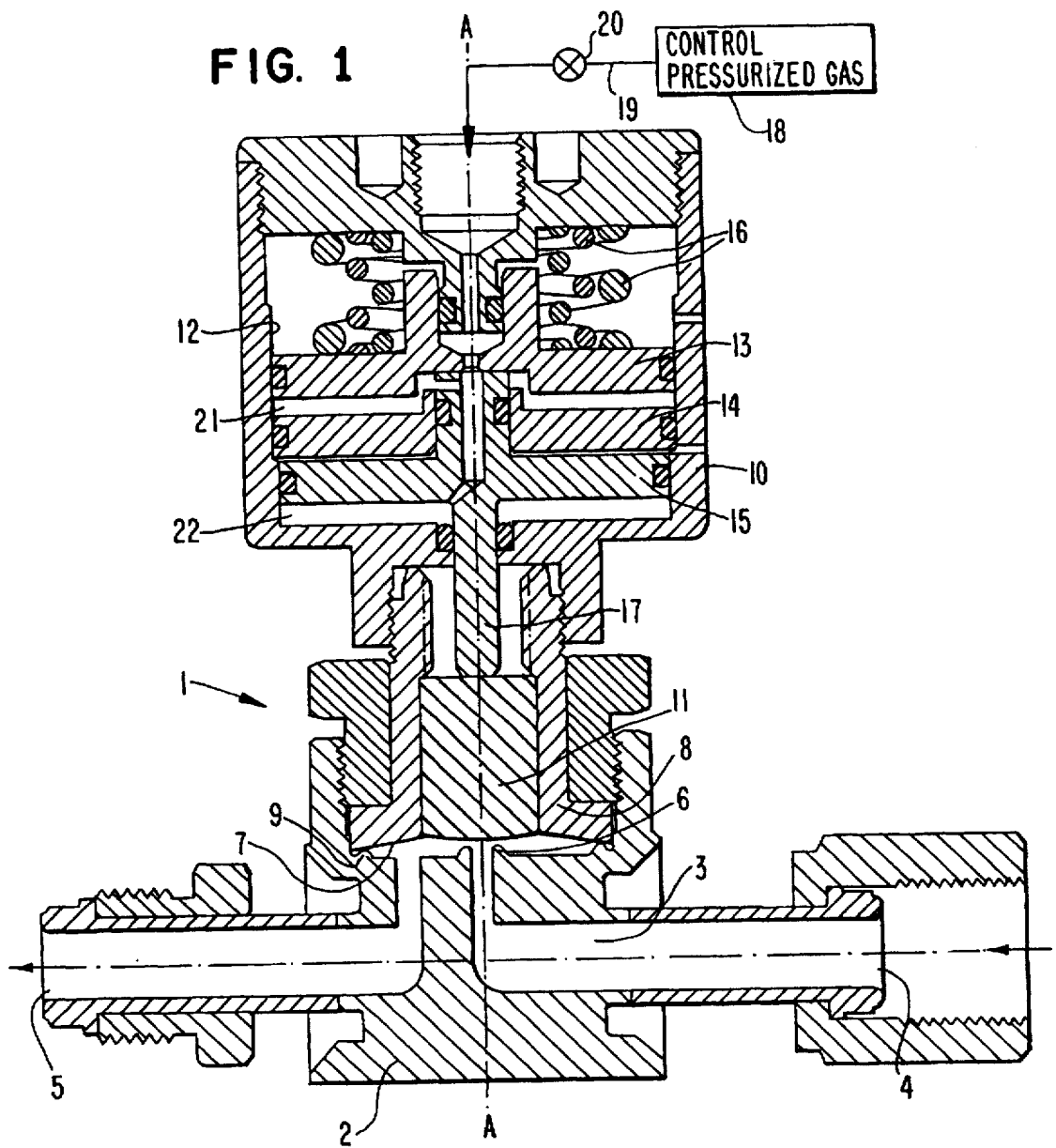
FIG. 1 is a cross sectional view through a pneumatic valve according to the preferred embodiment of the invention, taken along the longitudinal central axis of a gas passage through the valve and that of an actuator of the valve for opening and closing the gas passage, and depicting a schematic illustration of a control arrangement for operating the pneumatic valve.

Referring now to the drawings, a valve 1 having metal-to-metal dynamic (on/off) seating for controlling the flow of gas is depicted in detail in FIG. 1. The valve comprises a valve body 2 having a gas passage 3 extending therethrough for the flow of gas from an inlet 4 to an outlet 5 of the valve. A metal seat 6 in the form of a rounded, metal sealing projection extends angularly about the gas passage 3. The seat 6 is in the form of a toroid in the disclosed embodiment.

A flexible metal diaphragm 7 is mounted in the valve 1 so that the diaphragm can be moved into and out of sealing contact with the metal seat 6 to respectively close and open the gas passage 3. A radially outer portion of the diaphragm is statically sealed against the valve body 2 by a clamping member 8 forcing the diaphragm 7 against a toroidal-shaped projection 9 on the valve body. When so mounted in the valve, the diaphragm has a radially inner portion thereof which is adapted to move, with flexing of the diaphragm, to and from the metal valve seat 6 for closing and opening the gas passage therethrough. This movement of the diaphragm is caused by the movement of an actuator 10 of the valve in conjunction with the gas pressure on the diaphragm as discussed below.

The actuator 10 is operable for opening and closing the gas passage 3 by way of movement of the diaphragm relative to the metal sealing projection of the seat 6. In particular, the actuator transfers a sealing force to the metal seat 6 by way of diaphragm 7 in the off or closed mode of the valve and actuator. The actuator includes a metal backing member 11 in the form of a piston contacting the diaphragm 7 on a side of the diaphragm opposite a side thereof which makes sealing contact with the metal seat 6. In the disclosed embodiment, the actuator further comprises a cylinder 12 and pistons 13, 14 and 15 slidably arranged in the cylinder. An assembly of springs 16 yieldably biases the piston 13 in a downward direction, toward the valve seat 6, for closing the gas passage. The downward closing force is 100 to 120 pounds.

The closing force of the springs 16 on piston 13 is transmitted downwardly to the flexible metal diaphragm 7 by way of piston 15 and its piston rod 17. The lower end of the piston rod 17 abuts against the upper end of metal backing member 11. The metal backing member is in the form of a piston which is slidably arranged within the clamping member 8 for movement along the axis A—A of the actuator toward and away from the valve seat 6. The lower end of the piston 11 is convex, with a radius of curvature of one inch in the illustrated embodiment. Alternatively, the lower end of the metal backing member 11 could be in the form of a ball. These shapes and the hardness of the piston are effective to back up the hard flexible diaphragm for transmitting the closing force so as to form a narrow, continuous line of sealing contact between the sealing projection of the seat and the diaphragm.

The diaphragm used in the instrument valve 1 is typically very thin, in the range of 0.001 to 0.004 inch thick, for example, making it necessary to back up the thin flexible metal diaphragm 7 in the valve 1 with the metal backing member 11, shaped to the diaphragm's curvature where the diaphragm is contacting the seat. Research by the inventor has shown that with the limited actuator force possible in the relatively small, instrument valve 1 according to the invention, for effecting valve closing, a near absolute closure (leakage rate less than $1 \times 10^{-8}$ SCC/sec), in effect a leak-proof seal, can be obtained where the toroidal sealing projection 6 is formed of a relatively soft metal, Rockwell B65 to B100, and has a very small radius, 0.005–0.020 inch around the seating cross-section of the toroid. The diaphragm 7 which presses on the relatively soft metal seat 6 must be hard, typically Rockwell C50 or greater, preferably C60 to C70. Compressive strengths of the respective metals of the metal seat 6 and the diaphragm must be generally proportional to their hardness.

An analysis of the stresses needed to force the hard diaphragm into intimate contact with the softer metallic seat shows that stresses of 100,000 psi or more will not only make a leak-proof seal, but will stress the softer seat sufficiently to flatten any asperities or geometrical errors in the seat, as from machining or the order of 0.001 inch or smaller in size. A transfer of force from the diaphragm to the seat of this magnitude can only be achieved with the use of a hard metal backing member 11. If the metal backing member is softer, in the range of Rockwell B50 to C25 or so, the sealing force from the actuator 10 will not be transmitted properly through the diaphragm to the seat. Since the diaphragm 7 can only move in and out from the reformed seat, and is constrained against any rotation by the outer static seal of the diaphragm to the valve body, the seat so formed remains intact for the life of the valve.

In the disclosed embodiment, the valve body and seat are formed of 316L stainless steel with the seat being relatively soft, having a hardness of Rockwell B65 to B100, as noted above. The compressive yield strength of the valve body and seat is 80,000 psi. The hard or hardened metal backing plate 11 is formed of a hardened stainless steel, e.g. 17-4PH with a hardness greater than Rockwell C25, preferably C40 to 60. The compressive yield strength of the piston 11 is 200,000 psi. The metal of the diaphragm in the disclosed embodiment is Elgiloy which has been work hardened to have a hardness of Rockwell C50 or greater, preferably C60 to C70. The diaphragm has a compressive yield strength of 250,000 psi. However, other metals can be employed for the seat 6, diaphragm 7 and backing member 11 provided the aforementioned basic relationship of a relatively soft toroid for the seat, a hard (high compressive strength) diaphragm and a hard metal backing member properly contoured, is used.

A supply 18 of pressurized gas is conveyed by gas line 19 under the control of a solenoid valve 20 to the actuator 10 for controlling the operation of the valve 1 as depicted in FIG. 1. Absent application of the control pressurized gas via line 19 to the chambers 21 and 22 of the actuator by operation of the solenoid valve 20 to open the valve, the springs 16 downwardly bias the metal backing member 11 with a sealing force of between 100 and 120 pounds, so that the diaphragm 7 of the valve is pressed against the metal seat 6 to sealingly contact the seat to close the gas passage 3 through the valve. Application of the control pressure, 60 to 80 psi, for example, to the actuator 10 by opening of the solenoid valve 20 introduces the pressurized control gas to the chambers 21 and 22, depressing the springs 16 to move the pistons 13, 14 and 15 upwardly within the actuator. The piston rod 17 of the piston 15 is thus moved upwardly permitting the piston 11 backing-up the diaphragm to be moved upwardly in response to the gas pressure in the gas passage 3 in the valve. This opens the gas passage to the "on" or open position of the valve.

Figure 2:
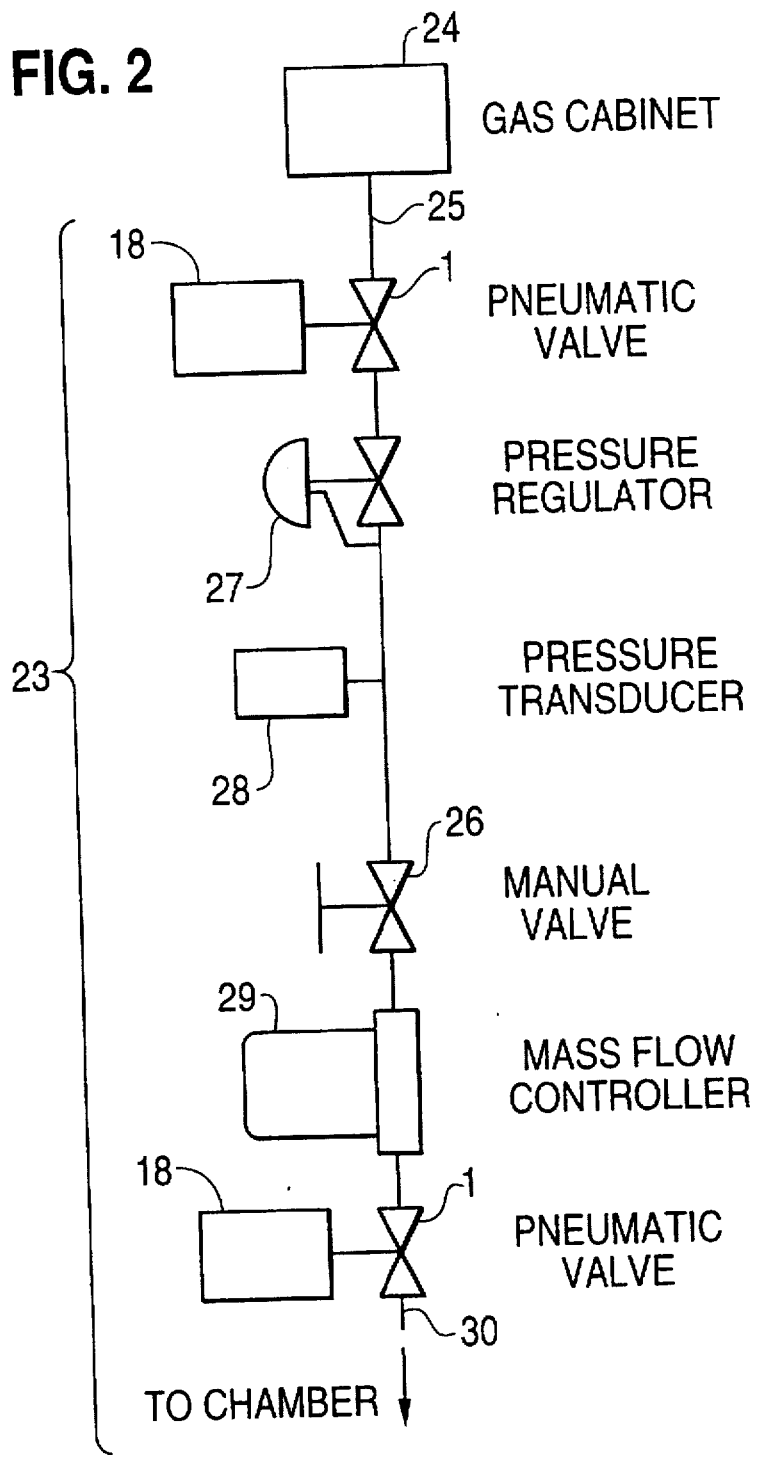
FIG. 2 is a schematic illustration of an apparatus of the invention for supplying high purity gas for making semiconductors, the apparatus including several valves according to the invention, that is two pneumatic valves as shown in FIG. 1 and a manual valve according to the invention.

By way of example, a valve 1 constructed according to the present invention can be installed at a point of use in an apparatus 23 for delivering high purity process gas for making semiconductors as shown schematically in FIG. 2. A typical inlet pressure of process gas from gas cabinet 24 to the apparatus 23 and valve 1 thereof by gas line 25 is 30 psi, and the maximum flow is two liters per minute. A valve seat 6 with a 0.062 inch orifice in the valve 1 will meet such a requirement. The diaphragm of the valve 1 makes a line of contact 0.002 inch wide with the toroid projection of the seat on a diameter of 0.080 inch. A force of 50 pounds applied by the actuator 10 to the line of contact 0.002 inch wide creates a stress of 99,000 psi. Any irregularity in the machining of the relatively soft metal seat on the order of 0.001 inch or smaller is size will be subjected to stress exceeding the yield strength and, as a result, reshaped to give a continuous line of contact between the seat and the diaphragm during the "off" or closed state of the valve. In that formed condition, a tight seal can be obtained with the seat using the relatively small closing force available from the actuator 10.

Tests showed that the valve 1 constructed according to the present invention, with a valve seat orifice of 0.062 inch is referred to above and with a 0.010 inch radius of curvature for the toroid sealing projection 6, resulted in an in-line sealing, e.g. the leakage rate across the valve seat was less than $10^{-8}$ cc per second with 30 psi gas pressure at the inlet. The quality of sealing with the valve 1 was maintained after 500,000 cycles. The pressure drop across the valve at a flow of 5 liters per minute was less than 0.25 psi with a 10 psi differential pressure.

The flexible metal diaphragm 7 in the disclosed embodiment is illustrated as a single, thin metal layer, of Elgiloy, but a laminate of several such layers could be used as the diaphragm. The valve 1 depicted in FIG. 1 is a pneumatic valve, operated by pressurized gas from supply 18 as noted above. However, the valve according to the invention can be a manually actuated valve. In such case, a preset spring would be incorporated into the stem of the valve to create the sealing force which would be manually turned "on" or "off" for attaining the metal-to-metal dynamic seating for controlling the flow of gas. Such a manual valve is schematically depicted at 26 in the apparatus 23 in FIG. 2.

The apparatus 23 in FIG. 2 comprises two pneumatic valves 1, 1 according to FIG. 1, at respective ends of the gas line 25 with the manual valve 26 being located intermediate the two. A pressure regulator 27, a pressure transducer 28 and a mass flow controller 29 are also located in the gas line 25 upstream of an outlet 30 of the apparatus.

Operation of the apparatus 23 employing the valves according to the present invention for delivering pressurized process gas from gas cabinet 24 to a chamber for making semiconductor devices comprises: prior to start of an active phase pneumatic valves 1, 1 are closed, manual valve 26 is open and mass flow controller 29 is set to zero; at the start of the active phase the pneumatic valves 1,1 are opened and the mass flow controller 29 is set to the desired flow; and at the end of the active phase the pneumatic valves 1,1 are closed and the mass flow controller is set to zero. At all times during this operation the pressure regulator remains set at the desired regulated pressure. Through the use of the improved valves 1,1 and 26 of the present invention having metal-to-metal seating without the use of plastics or elastomers in contact with the gas, moisture adsorbed and released in the dry gas system can be reduced as compared with an apparatus employing conventional valves using Kel-f fluorocarbon polymers for seating. The apparatus 23 is shown in further detail in the concurrently filed, commonly assigned application Ser. No. 08/575,021, filed Dec. 19, 1995, for APPARATUS FOR DELIVERING PROCESS GAS FOR MAKING SEMICONDUCTORS AND METHOD OF USING SAME, as referred to above.

While I have shown and described only one embodiment in accordance with the present invention, the invention is not limited to the details thereof as shown and described herein but is susceptible to the numerous variations as will be readily understood by the skilled artisan without departing from the spirit of the invention or the scope of the following claims.

I claim:

1. A relatively small, instrument valve having metal-to-metal dynamic seating for controlling the flow of gas in supplying high purity gas for making semiconductors, said valve comprising a valve body having a gas passage extending therethrough for the flow of gas, a seat having a rounded, metal sealing projection with a relatively small radius around the seating cross section of the seat extending about said gas passage, a flexible metal diaphragm mounted in said valve so that said diaphragm can be moved into and out of sealing contact with said metal sealing projection of said seat to respectively close and open said gas passage, and an actuator operable for opening and closing said gas passage by way of movement of said diaphragm relative to said metal sealing projection, said actuator including a metal backing member forcedly contacting said diaphragm during closing of said gas passage on a side of said diaphragm opposite a side thereof which makes said sealing contact with said metal sealing projection, wherein the materials of said valve are selected so that no plastic or elastomer contacts gas flowing through said valve, wherein said metal sealing projection of said seat is formed of relatively soft metal and each of said flexible metal diaphragm and said metal backing member of said actuator is formed of relatively hard metal, and wherein said metal seat and said metal backing member are configured such that sealing contact between the metal diaphragm and the metal seat is a relatively narrow, continuous line of contact extending about the gas passage in valve closing whereby a near absolute closure, leakage rate less than $1\times10^{-8}$ SCC/sec., in effect a leak-proof seal can be obtained where relatively low forces are available for providing pressure control in the valve.

2. The valve according to claim 1, wherein said metal sealing projection is formed integrally with said valve body.

3. The valve according to claim 1, wherein said metal sealing projection of said seat has a hardness of Rockwell B65 to B100.

4. The valve according to claim 1, wherein said flexible metal diaphragm has a hardness of Rockwell C50 or greater.

5. The valve according to claim 1, wherein said flexible metal diaphragm has a thickness of 0.001–0.004 inch.

6. The valve according to claim 1, wherein said metal backing member has a hardness greater than Rockwell C25.

7. The valve according to claim 1, wherein said metal backing member has a contour which is convexly rounded at a surface thereof which contacts said diaphragm on a side of said diaphragm opposite the side of said diaphragm which contacts said metal sealing projection of said seat during closing of said gas passage.

8. The valve according to claim 1, wherein said metal sealing projection of said seat is toroidal.

9. The valve according to claim 8, wherein said toroidal sealing projection has a radius of curvature of 0.005–0.020 inch as seen in a cross section taken along a longitudinal central axis of said toroidal sealing projection.

10. The valve according to claim 1, wherein said actuator forces said metal diaphragm against said metal sealing projection of said seat by way of said metal backing member with a force of between 50 and 150 pounds when said gas passage is closed by said actuator.

11. The valve according to claim 10, wherein said actuator includes a cylinder and at least one piston slidably arranged in said cylinder, spring means for yieldably biasing said at least one piston in a direction for closing said gas passage with said force of said 50 to 150 pounds, means for introducing a pressurized fluid for moving said at least one piston against said biasing force of said spring means for opening said gas passage and a piston rod for transmitting said closing force from said at least one piston to said metal backing member.

12. The valve according to claim 1, wherein said metal backing member is in the form of a piston which is slidably arranged in said valve for movement toward and away from said metal sealing projection as a result of forces thereon from said actuator and gas pressure in said valve acting on said diaphragm.

13. The valve according to claim 1, further comprising means for sealingly clamping a radially outer portion of said diaphragm against said valve body for mounting said diaphragm in said valve, a radially inner portion of said diaphragm being free to be moved into and out of sealing contact with said valve seat for closing and opening said gas passage.

* * * * *